United States Patent
Xu et al.

(10) Patent No.: US 12,228,978 B2
(45) Date of Patent: Feb. 18, 2025

(54) HINGE MECHANISM AND FOLDABLE DEVICE HAVING SAME

(71) Applicant: Google LLC, Mountain View, CA (US)

(72) Inventors: Kingston Xu, Sunnyvale, CA (US); Young Im, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 240 days.

(21) Appl. No.: 17/596,161

(22) PCT Filed: Dec. 8, 2020

(86) PCT No.: PCT/US2020/070875
§ 371 (c)(1),
(2) Date: Dec. 3, 2021

(87) PCT Pub. No.: WO2021/127684
PCT Pub. Date: Jun. 24, 2021

(65) Prior Publication Data
US 2022/0155827 A1    May 19, 2022

Related U.S. Application Data

(60) Provisional application No. 62/949,182, filed on Dec. 17, 2019.

(51) Int. Cl.
*G06F 1/16* (2006.01)
*H04M 1/02* (2006.01)

(52) U.S. Cl.
CPC .......... *G06F 1/1681* (2013.01); *G06F 1/1652* (2013.01); *H04M 1/0237* (2013.01); *H04M 1/0268* (2013.01)

(58) Field of Classification Search
None
See application file for complete search history.

(56) References Cited

U.S. PATENT DOCUMENTS 9,606,578 B2    3/2017 Yuan et al.
10,306,783 B2 *  5/2019 Seo .................. G06F 1/1681
(Continued)

FOREIGN PATENT DOCUMENTS

CN    208173129 U    11/2018
CN    209199497 U    8/2019
WO    2019178815 A1    9/2019

OTHER PUBLICATIONS

Translation of WO 2019178815 (Year: 2023).*
(Continued)

*Primary Examiner* — Gennadiy Tsvey
(74) *Attorney, Agent, or Firm* — Shumaker & Sieffert, P.A.

(57) ABSTRACT

A foldable device includes a foldable layer and a hinge mechanism including at least one hinge module. The at least one hinge module includes a first hinge section and a second hinge section that are each rotatable relative to a central hinge axis to move the device between an unfolded and a folded configuration. The first and second hinge sections may each include a first rod that is threadably engaged in a first passage in a corresponding housing of the device, and a second rod that is movably received in a second passage in a corresponding housing of the device. Movement of the first rod within the first passage adjusts a length of the hinge module during folding/unfolding of the device to maintain bending within a neutral layer of the foldable layer, while being guided by movement of the second rod in the second passage.

8 Claims, 13 Drawing Sheets

(56) References Cited

U.S. PATENT DOCUMENTS

| | | | |
|---|---|---|---|
| 10,352,354 B1 | 7/2019 | Hsu et al. | |
| 10,423,019 B1* | 9/2019 | Song | G06F 1/1652 |
| 2012/0044620 A1* | 2/2012 | Song | H04M 1/0216 |
| | | | 361/679.01 |
| 2015/0023031 A1* | 1/2015 | Endo | F16M 13/00 |
| | | | 362/427 |
| 2017/0235337 A1 | 8/2017 | Vic et al. | |
| 2018/0279834 A1* | 10/2018 | Wang | A47J 27/13 |
| 2018/0284839 A1* | 10/2018 | Lin | H04M 1/02 |
| 2019/0324499 A1* | 10/2019 | Miyamoto | G06F 1/1616 |
| 2020/0117245 A1* | 4/2020 | Ou | G06F 1/1624 |
| 2020/0325937 A1* | 10/2020 | Baldwin | F16D 33/18 |
| 2021/0011514 A1 | 1/2021 | Wang et al. | |
| 2021/0181809 A1* | 6/2021 | Zhang | G06F 1/1681 |

OTHER PUBLICATIONS

International Preliminary Report on Patentability from International Application No. PCT/US2020/070875 dated May 17, 2022, 12 pp.
Response to Communication Pursuant to Rules 161(1) and 162 EPC dated Mar. 15, 2022, from counterpart European Application No. 20834109.9, filed Apr. 28, 2022, 19 pp.
International Search Report and Written Opinion for PCT Application No. PCT/US2020/070875, mailed on Apr. 19, 2021, 16 pages.
First Office Action and Search Report, and translation thereof, from counterpart Chinese Application No. 202080064693.4 dated Jan. 9, 2024, 18 pp.
Notice of Intent to Grant, and translation thereof, from counterpart Chinese Application No. 202080064693.4 dated Jun. 6, 2024, 4 pp.
Communication pursuant to Article 94(3) EPC from counterpart European Application No. 20834109.9 dated Sep. 18, 2024, 8 pp.

\* cited by examiner

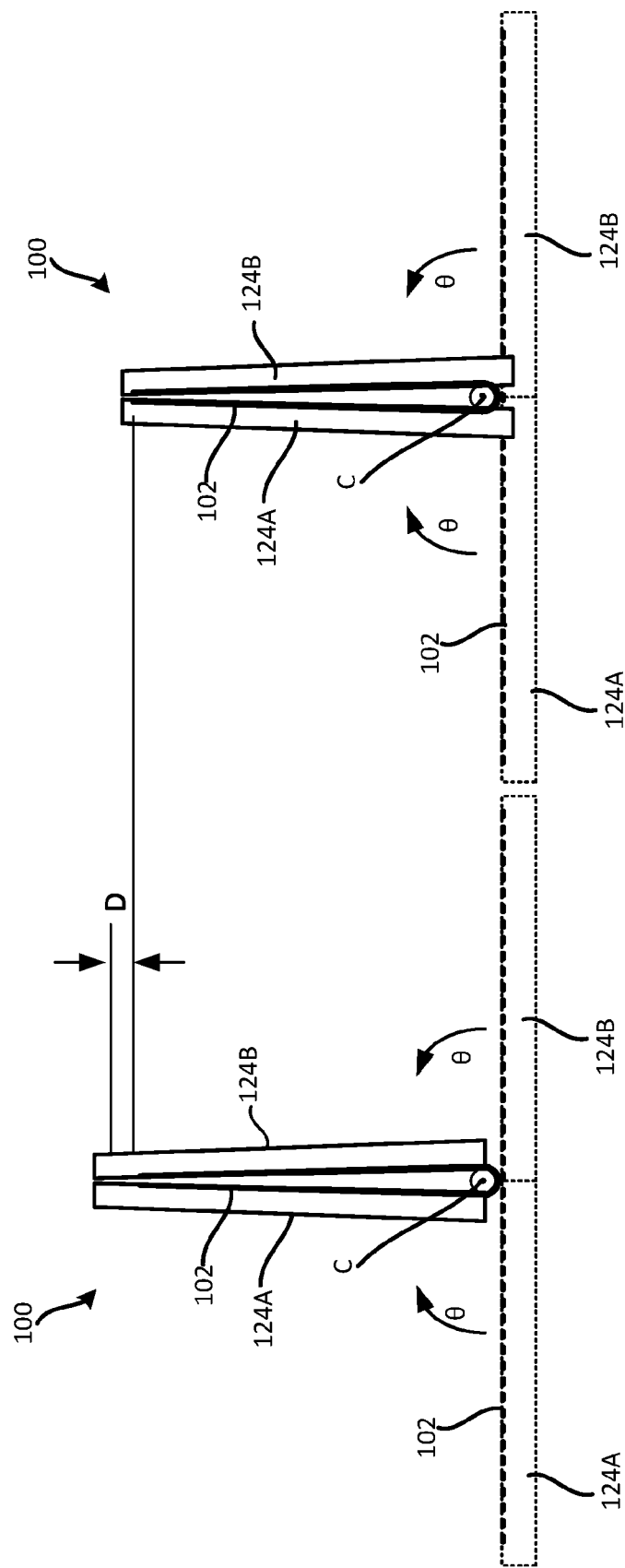

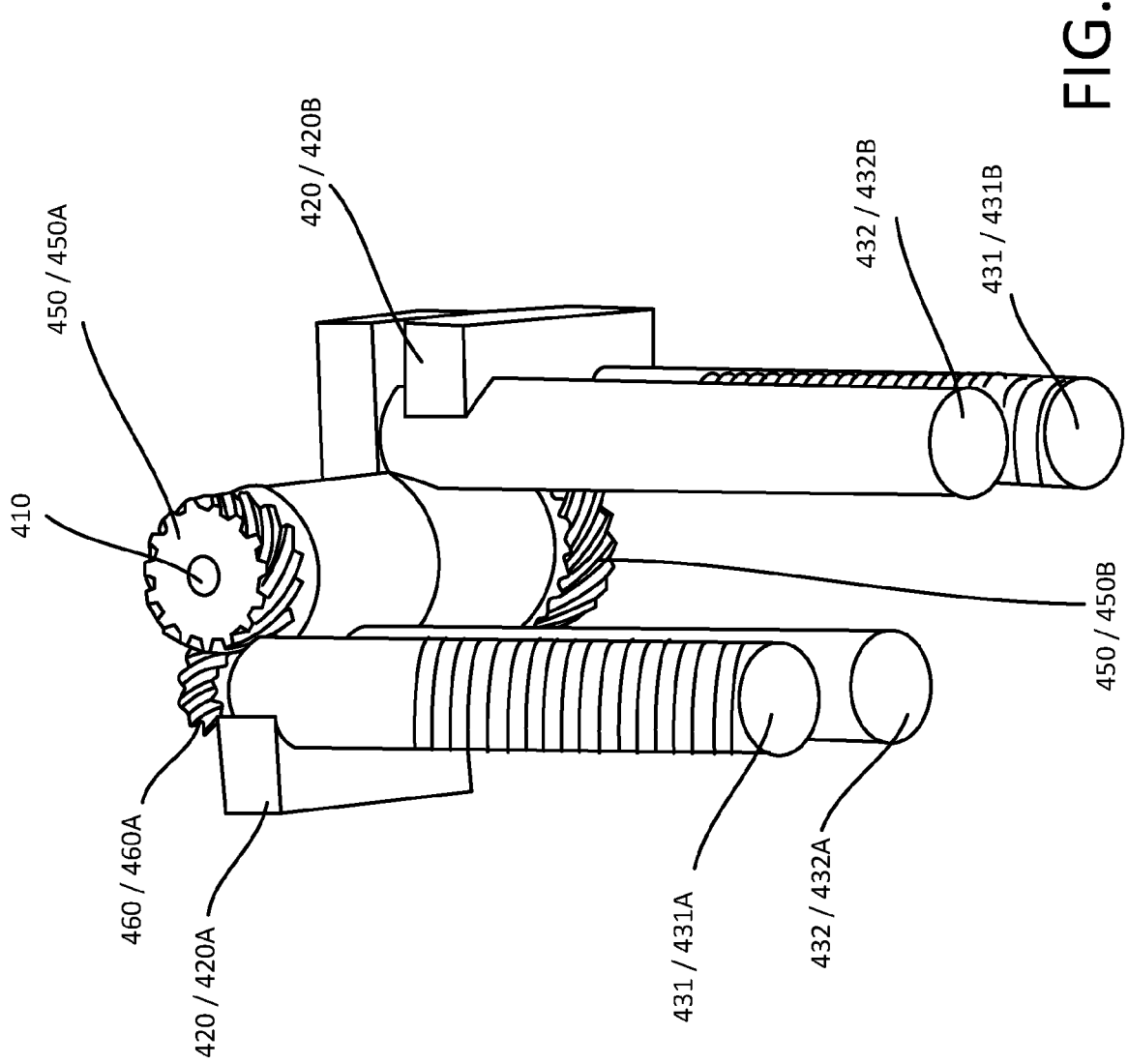

HINGE MECHANISM AND FOLDABLE DEVICE HAVING SAME

CROSS REFERENCE TO RELATED APPLICATIONS

This application is a 35 U.S.C. § 371 National Phase Entry Application from PCT/US2020/070875, entitled "HINGE MECHANISM AND FOLDABLE DEVICE HAVING SAME," filed on Dec. 8, 2020, designating the U.S., which claims the benefit of U.S. Provisional Application No. 62/949,182, filed on Dec. 17, 2019, the disclosures of which are incorporated herein by reference in their entirety.

TECHNICAL FIELD

This description relates, in general, to hinge mechanisms for foldable devices, and, in particular, to hinge mechanisms supporting foldable display systems.

BACKGROUND

Modern computing devices often attempt to achieve a balance between portability and functionality. The desire for a device that provides for a rich display of information on a single surface (suggesting a device having a relatively large form factor) may conflict with the desire to have a device that is small enough to be easily carried and easily accessible (suggesting a device having a relatively small form factor). A flexible, or foldable, display device may enhance the capabilities of a computing device, in that, in a folded configuration, the computing device may have a relatively small form factor, and in an unfolded configuration, the device may take advantage of a relatively large display area. Flexible, or foldable, display devices may be fragile and prone to deformation and damage, particularly when a neutral axis of bending is not maintained as the foldable display device is folded and unfolded, thus degrading reliability and product performance. In some situations, mechanisms guiding and supporting the folding and unfolding of such a display device may be relatively complex, and susceptible to failure. These complex mechanisms may produce a somewhat artificial folding and unfolding motion, and may not maintain the folding and unfolding of the display device within the neutral axis, thus introducing stress on the display device, and damaging components of the display device. A hinge mechanism that provides dynamic support, and that guides movement of the foldable display device without causing a shift in the neutral axis of bending, may maintain a desired contour, or curvature, of the display device through the folding and unfolding motions, and may prevent damage to the foldable display device due to excessive compressive and/or tensile forces exerted on components of the display device.

SUMMARY

In a general aspect, a hinge mechanism may include at least one hinge module. The at least one hinge module may include a central hinge shaft defining a central hinge axis, a first hinge section coupled to a first portion of the central shaft, and a second hinge section coupled to a second portion of the central shaft. The first hinge section and the second hinge section may be rotatable relative to each other about the central hinge axis. The first hinge section and the second hinge section may each include a bracket coupled to the central hinge shaft, a first rod having a first end thereof coupled to the bracket and a second end thereof movably received in a first passage defined in a base member, and a second rod having a first end thereof coupled to the bracket and a second end thereof movably received in a second passage defined in a base member.

In some implementations, the first hinge section and the second hinge section may be symmetrically arranged about the central hinge shaft, and wherein movement of the first and second rods in the first and second passages of the base member of the first hinge section may be synchronized with movement of the first and second rods in the first and second passages of the base member of the second hinge section. In some implementations, in a first configuration of the hinge module, the first rod may be at a first position within the first passage and the base member of the first hinge section and the base member of the second hinge section may be spaced apart by a first distance. In a second configuration of the hinge module, the first rod may be at a second position within the first passage, and the base member of the first hinge section and the base member of the second hinge section may be spaced apart by a second distance that is greater than the first distance.

In some implementations, the first rod may be threadably engaged in the first passage such that the first rod moves in a first direction longitudinal into the first passage in response to rotation of the bracket about the central hinge axis in a first rotational direction, and the first rod moves in a second longitudinal direction out of the first passage in response to rotation of the bracket about the central hinge axis in a second rotational direction. In some implementations, a position of the second rod in the second passage may define an anti-rotation mechanism that restricts rotation of the base member in response to threaded movement of the first rod in the first passage.

In some implementations, the first hinge section and the second hinge section may also include a first helical gear mounted on an end portion of the central hinge shaft, concentric with the central hinge shaft such that the first helical gear rotates about the central hinge axis, and a second helical gear mounted on an end portion of the first rod, meshed with the first helical gear. In some implementations, the second helical gear may rotate in response to rotation of the first helical gear, and the second helical gear may rotate about a cross-axis that is orthogonal to the central hinge axis. In some implementations, the first rod may rotate together with the second helical gear, the first rod may be threadably engaged in the first passage such that rotation of the first rod in a first direction about the cross-axis draws the first rod further into the first passage, and rotation of the first rod in a second direction about the cross-axis draws the first rod further out of the first passage.

In some implementations, the hinge mechanism may be configured to be received in a computing device, at a position corresponding to a bendable section of a foldable display, in a space formed between a first housing and a second housing of the computing device, with the first hinge section of each hinge module coupled to the first housing, and the second hinge section of each hinge module coupled to the second housing. In some implementations, the first configuration may be an unfolded configuration, and the second configuration may be a folded configuration, and a distance between the first housing and the second housing supported by the hinge module in the first configuration may be greater than a distance between the first housing and the second housing in the second configuration.

In another general aspect, a foldable device may comprise a housing, a foldable display coupled to the housing, and a hinge mechanism installed in the housing, at a portion of the housing corresponding to a bendable section of the foldable display, the hinge mechanism including at least one hinge module. The at least one hinge module includes a central hinge shaft defining a central hinge axis, a first hinge section coupled to a first portion of the housing, and to a first portion of the central shaft, and a second hinge section coupled to a second portion of the housing, and to a second portion of the central shaft, wherein the first hinge section and the second hinge section are rotatable relative to each other about the central hinge axis. The first hinge section and the second hinge section each include a first helical gear mounted on the central hinge shaft, such that the first helical gear rotates about the central hinge axis, a first rod, a second helical gear coupled at a first end of the first rod such that the first rod rotates together with the second helical gear about a cross axis that is orthogonal to the central hinge axis, wherein the second helical gear is in meshed engagement with the first helical gear, and a base member, wherein a second end portion of the first rod is movably received in a first passage defined in the base member, wherein the first rod moves longitudinally in the first passage in response to rotation of the first and second hinge sections about the central hinge axis.

In some implementations, in a first configuration of the hinge module, the first rod may be at a first position within the first passage defined in the base member, and the base member of the first hinge section and the base member of the second hinge section may be spaced apart by a first distance; and in a second configuration of the hinge module, the first rod may be at a second position within the first passage defined in the base member, and the base member of the first hinge section and the base member of the second hinge section may be spaced apart by a second distance that is greater than the first distance.

In some implementations, the first hinge section and the second hinge section may be symmetrically arranged about the central hinge shaft, and wherein movement of the first rod in the first passage of the base member of the first hinge section may be synchronized with movement of the first rod in the first passage of the base member of the second hinge section.

In some implementations, the first hinge section and the second hinge section each may include a bracket, wherein a first end portion of the first rod is coupled to the bracket, a second rod having a first end portion thereof coupled to the bracket and a second end thereof movably received in a second passage formed in the base member.

In some implementations, the first rod is threadably engaged in the first passage, such that rotation of the first rod in a first direction about the cross-axis draws the first rod further into the first passage, and rotation of the first rod in a second direction about the cross-axis draws the first rod further out of the first passage, and wherein the second rod restricts rotation of the base member as the first rod rotates into and out of the first passage.

BRIEF DESCRIPTION OF THE DRAWINGS

FIGS. 2A-2D are schematic diagrams illustrating a neutral layer of a foldable device, as the foldable device moves between an unfolded and a folded configuration.

FIG. 6B is a second perspective view, of the example hinge module of the example hinge mechanism shown in FIGS. 4A, 4B and 5, in a fully folded configuration.

DETAILED DESCRIPTION

A hinge mechanism, in accordance with implementations described herein, includes at least one dynamic hinge assembly, or hinge module. Each hinge assembly, or hinge module, may have a rotational axis and movement that corresponds to a neutral axis of bending of a foldable display of a computing device in which the hinge mechanism is housed. The hinge mechanism including the dynamic hinge assembly, or hinge module, in accordance with implementations described herein, provides for a change in length in the hinge mechanism. In some implementations, a rate of change of the length of the hinge mechanism corresponds to a change in the foldable display coupled thereto as the foldable display is folded and/or unfolded. This maintains the axis of bending of the foldable display within the neutral axis, so as to avoid excessive tension and/or compression on fragile components of the foldable display. In some implementations, the hinge mechanism maintains the foldable display within allowable bending radius limits of the foldable display, both in the folded configuration and in the unfolded configuration of the computing device.

Figure 1A:
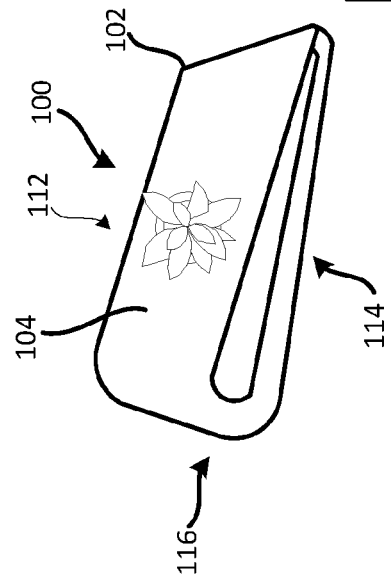
FIGS. 1A-1D illustrate an example computing device including an example foldable display.
Figure 1B:
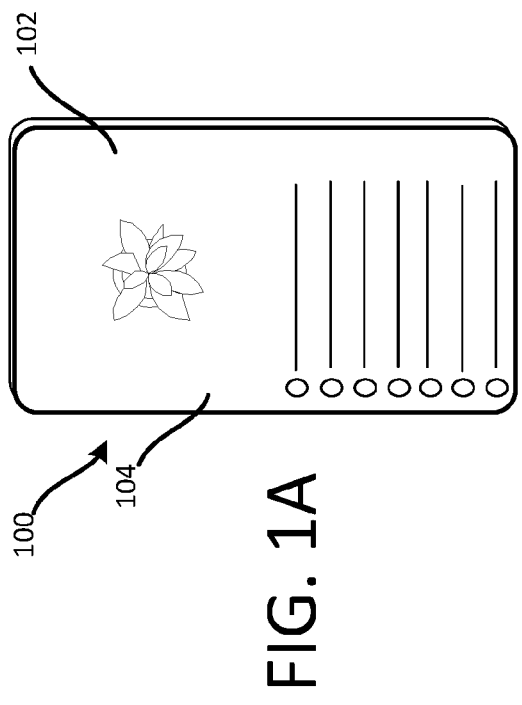
Figure 1C:
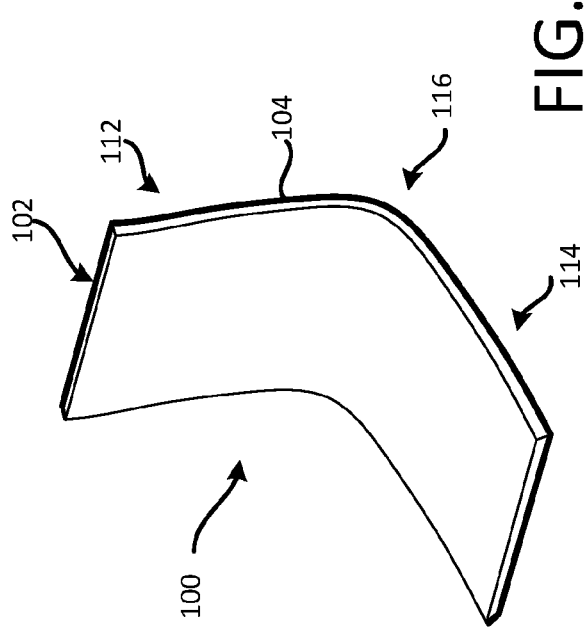
Figure 1D:
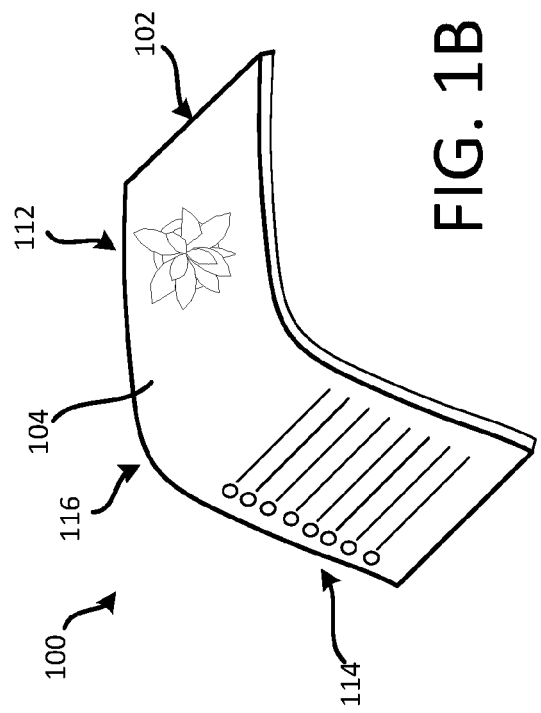

FIGS. 1A-1D illustrate an example computing device 100 that includes a foldable layer 102. In particular, FIG. 1A is a front view of the example computing device 100 in an unfolded configuration. FIG. 1B is a perspective view of the example computing device 100 in a partially folded configuration, in which a display surface 104 faces outward. FIG. 1C is a side view of the example computing device 100 in a fully folded configuration, in which the display surface 104 faces outward. FIG. 1D is a perspective view of the example computing device 100 in a partially folded configuration, in which the display surface 104 faces inward. In the example computing device 100 shown in FIGS. 1B and 1C, the foldable layer 102 is a foldable display 102 that is mounted so that the display surface 104 faces outward in the folded configuration. In the example computing device 100 shown in FIG. 1D, the foldable layer 102 is a foldable display 102 that is mounted so that the display surface 104 faces inward in the folded configuration. Principles to be described herein may apply to computing devices including foldable displays mounted so that display surface of the foldable display faces outward and also to computing devices including foldable displays mounted so that the display surface of the foldable display faces inward. The foldable display 102 can include a flexible organic light emitting diode (OLED) layer.

In some implementations, the foldable display 102 can include a first relatively flat, relatively rigid, or -semi-rigid, section 112, a second relatively flat, relatively rigid, or semi-rigid, section 114, and a foldable portion or bendable section 116. In some implementations, the foldable display 102 can include more than two flat, rigid sections 112, 114 and/or more than one bendable section 116. In some implementations, the foldable display 102 can include zero, or only one, flat rigid section 112, 114. For example, when a foldable display 102 includes zero flat rigid sections, the foldable display 102 may be substantially continuously bendable, and may be rolled up, as in a scroll. The example foldable display 102 shown in FIGS. 1A-1D includes an example bendable section 116 that allows the foldable display 102 to bend about an axis. In some implementations, the foldable display 102 can include more than one bendable section that allows the flexible display 102 to bend about more than one axis.

In the example computing device 100 shown in FIGS. 1A-1D, the bendable section 116 may allow the foldable display 102 to bend, or fold, for example, in an arcuate shape that has a bending radius and/or a radius of curvature. In some implementations, a hinge mechanism, in accordance with implementations described herein, may support and guide a folding and an unfolding of the foldable display 102 at the bendable section 116. In some implementations, a hinge mechanism, in accordance with implementations described herein, may be installed in the computing device 100, at a position corresponding to the bendable section 116 of the foldable display 102. In some implementations, a hinge mechanism may limit or restrict folding or bending of the foldable display 102 to within allowable bending parameters, to prevent damage to fragile components of the foldable display 102. For example, in the folded configurations shown in FIGS. 1C and 1D, the hinge mechanism may prevent the foldable display 102 from bending beyond a minimum bending radius (e.g., less than 10 millimeters, less than 5 millimeters, or less than 2 millimeters). In the unfolded configuration shown in FIG. 1A, the hinge mechanism may prevent the foldable display 102 from bending beyond a maximum bending radius.

Figure 2A:
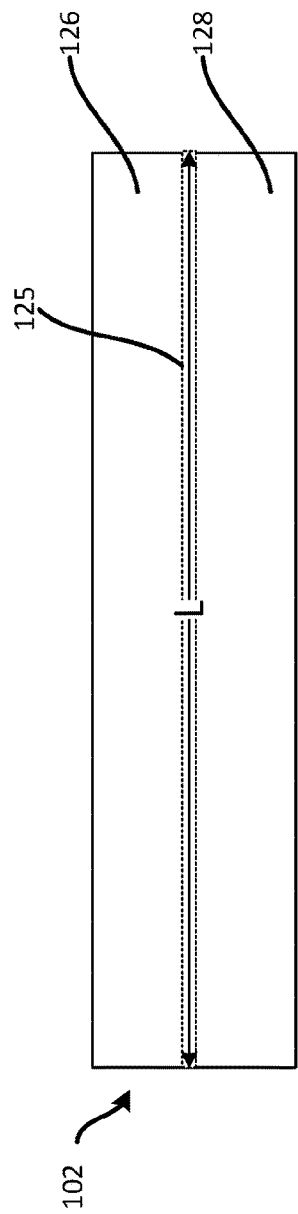
Figure 2B:
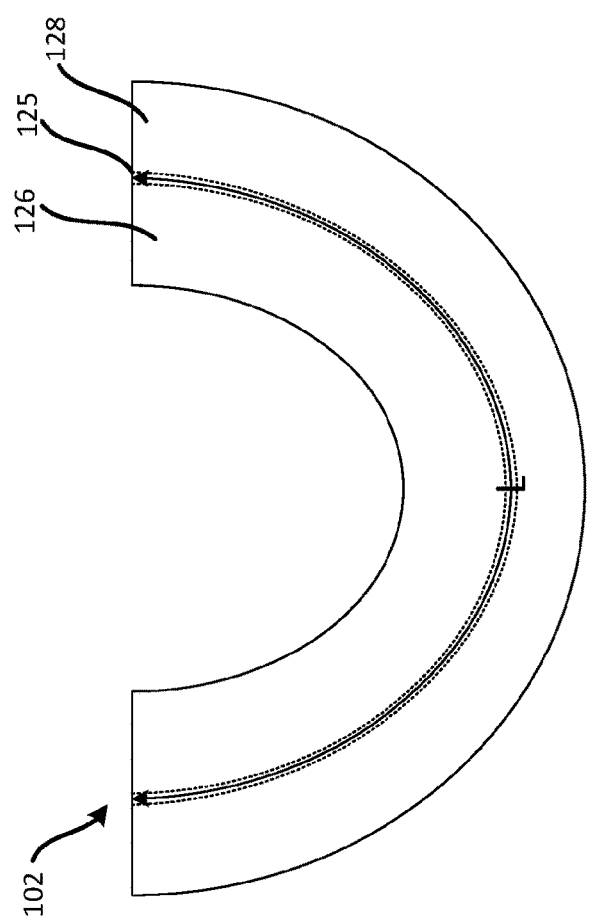

FIG. 2A is a schematic view of an example section of the foldable layer 102 in an unfolded configuration. FIG. 2B is a schematic view of the example section of the foldable layer 102 in a folded/partially folded configuration. In some implementations, a neutral axis 125, or a neutral layer 125, of the foldable layer 102 may be defined in a portion of the foldable layer 102 in which an unfolded length L of the foldable layer 102 is substantially equal to a folded length L of the foldable layer 102. For example, in some implementations, the neutral axis 125 of the foldable layer 102 may be between a first portion 126 of the foldable layer 102 that is in compression in the folded configuration and a second portion 128 of the foldable layer 102 that is in tension in the folded configuration. That is, in some implementations, the neutral axis 125 may be positioned along a portion of the foldable layer 102 that is neither in compression nor in tension when the foldable layer 102 is folded or bent. In some implementations, particularly fragile components of the foldable layer 102 may be positioned along the neutral axis 125. Positioning of the fragile components along, or within, the neutral axis 125 of the foldable layer 102 may protect the fragile components from damage as the foldable layer 102 is folded and unfolded. This change in length L as the foldable layer 102 is folded and unfolded, and the interaction of the foldable layer 102 with a housing of a computing device to which the foldable layer 102 is coupled, will be described in more detail with respect to FIGS. 2C and 2D.

FIGS. 2C and 2D schematically illustrate the change in length L associated with the folding and unfolding of the foldable layer 102 as it relates to a change in stroke distance D of first and second bodies or portions of a housing of a computing device to which the foldable layer is coupled. The example arrangement shown in FIGS. 2C and 2D illustrates a foldable layer mounted on a computing device so that the display surface thereof faces inward in the folded configuration, simply for purposes of discussion and illustration. However, the principles to be described may apply similarly to a foldable layer mounted on a computing device so that the display surface thereof faces outward in the folded configuration.

FIG. 2C schematically illustrates a folding/unfolding of the example foldable layer 102 in an example in which the foldable layer 102 is movably coupled to a first body 124A and a second body 124B of the example computing device 100. FIG. 2D schematically illustrates a folding/unfolding of the example foldable layer 102 in an example in which the foldable layer is fixedly coupled, or adhered, to the first body 124A and the second body 124B.

In FIG. 2C, to move from the unfolded configuration (shown in dotted lines) to the folded configuration (shown in solid lines), the foldable layer 102 is rotated about a center of rotation C of the foldable layer 102. A minimum, and a maximum, bending radius of the foldable layer 102 may be measured about the center of rotation C of the foldable layer 102. In moving from the unfolded configuration to the folded configuration shown in FIG. 2C, the center of rotation of the first body 124A and the center of rotation of the second body 124B are the same as the center of rotation C of the foldable layer 102. This causes movement, for example, a sliding movement, of the first and second bodies 124A, 124B, as shown in FIG. 2C, in order to accommodate curvature at the bendable section of the foldable layer 102 due to the folding and unfolding of the foldable layer 102. Sliding movement of the first and second bodies 124A, 124B to accommodate the curvature at the bendable section of the foldable layer 102 in this manner results in a stroke distance D, compared to the arrangement shown in FIG. 2D, in which the first and second bodies 124A, 124B are fixedly attached (e.g., adhered) to the foldable layer 102. To keep the neutral axis 125 within the foldable layer 102 as the computing device 100 is moved between the unfolded configuration and the folded configuration, a hinge mechanism, in accordance with implementations described herein, may allow the first and second bodies 124A, 124B to move, to accommodate the change in length L, while the foldable layer 102 is bent about its center of rotation C.

A hinge mechanism, in accordance with implementations described herein, may follow a path of motion of the neutral axis of the foldable layer, as the foldable layer moves between the folded configuration and the unfolded configuration. In some implementations, the rate of change in length of the hinge mechanism may be synchronized with the neutral axis of the foldable layer, so that the neutral axis is maintained at a predetermined location in the layer as the foldable layer is folded and unfolded, and damage to the fragile components of the components within foldable layer may be prevented.

A computing device, in accordance with implementations described herein, may include a hinge mechanism, in accordance with implementations described herein, that may support and guide a folding and an unfolding of a foldable display of the computing device. The hinge mechanism, in accordance with implementations described herein, may provide for a change in length of the hinge mechanism, for example, corresponding to a distance between a first body (or housing) and a second body (or housing) of the computing device, to accommodate a change in length at a bendable section of the foldable display as the computing device is folded and unfolded. The rate of change in length of the hinge mechanism corresponding to the distance between the first and second bodies (or housings) of the computing device may be in synchronization with the neutral axis of the foldable display as it guides the folding and unfolding of the computing device. This may allow the foldable display to maintain the bending, or folding, or rotating motion about its center of rotation, and to avoid shifting of the neutral axis, away from a predetermined location in the display, thus avoiding excessive stress on fragile components of the foldable display.

Figure 3A:
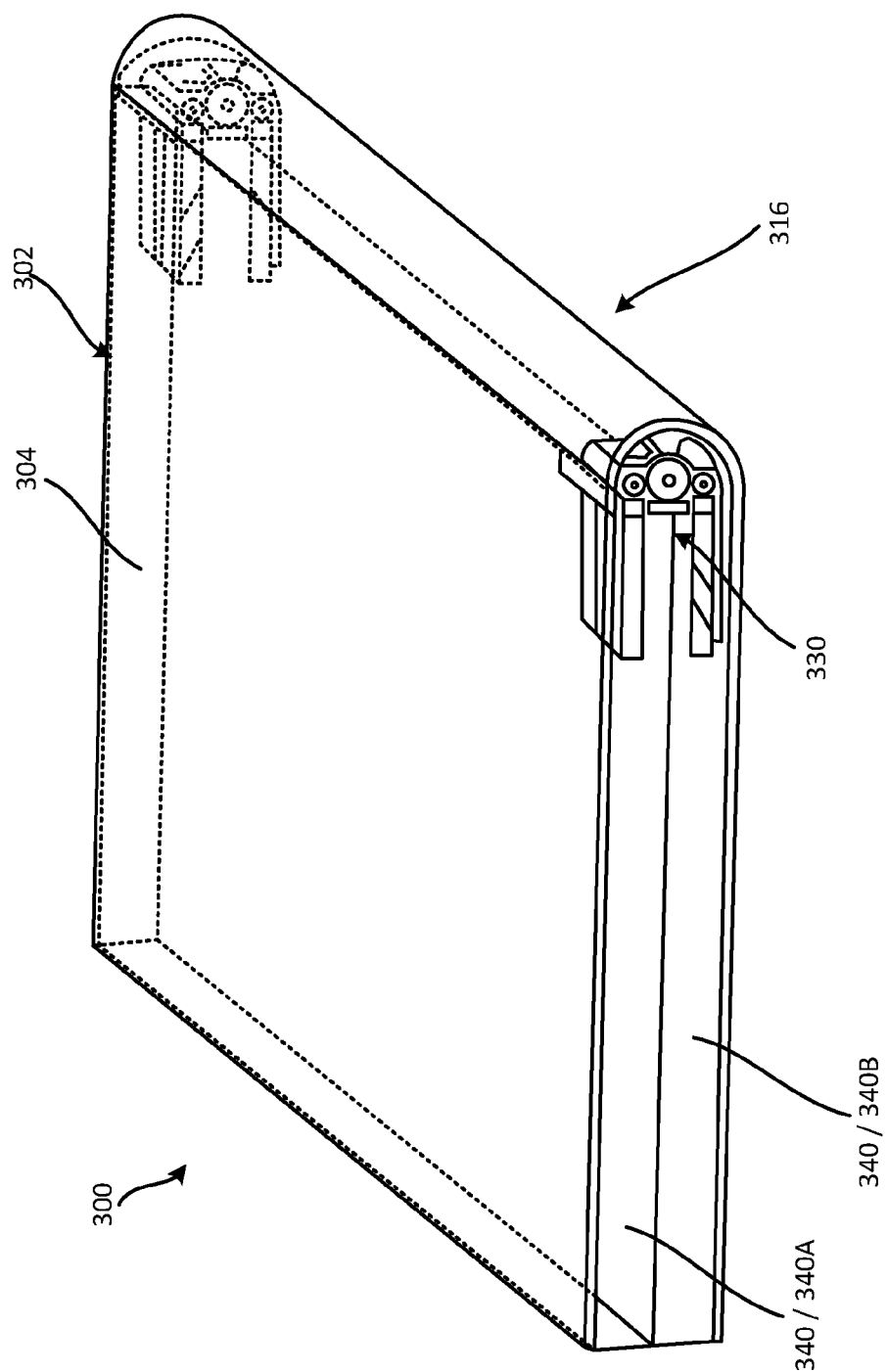
FIG. 3A is a perspective view of an example computing device including an example hinge mechanism, in a folded configuration, in accordance with implementations described herein.
Figure 3B:
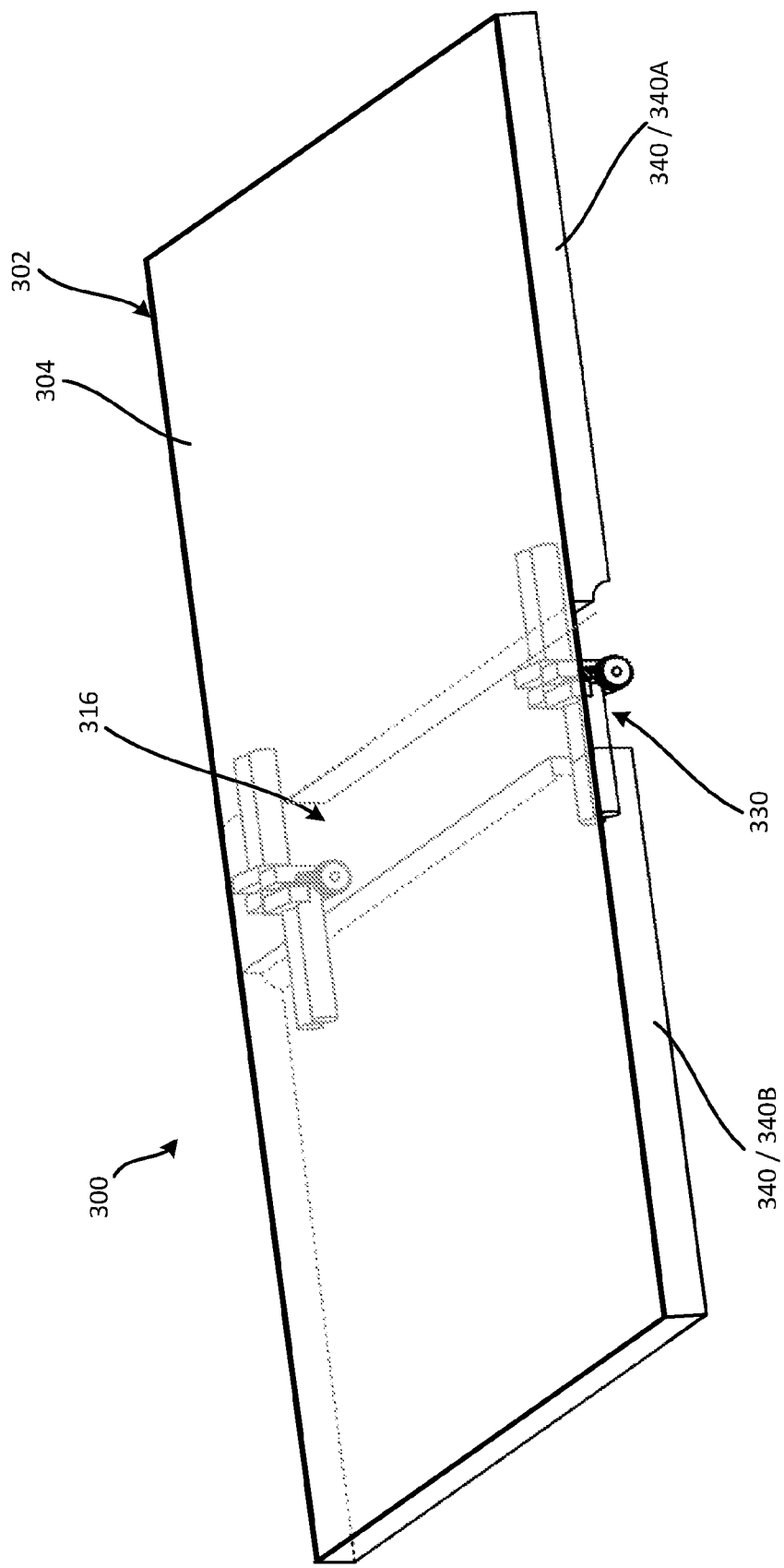
FIG. 3B is a perspective view of the example computing device including the example hinge mechanism shown in FIG. 3A, in an unfolded configuration, in accordance with implementations described herein.

FIGS. 3A and 3B are perspective views of an example computing device 300 including a foldable layer 302, such as, for example, a foldable display 302, supported by an example hinge mechanism 330, in accordance with implementations described herein. The example hinge mechanism 330 may be received in a housing 340 of the computing device 300. The example hinge mechanism 330 may be positioned within the housing 340, for example, at a position corresponding to a foldable portion 316, or a bendable section 316, of the foldable display 302. For example, in some implementations, the hinge mechanism 330 may be positioned between a first housing 340A and a second housing 340B of the computing device 300. In FIG. 3A, the example computing device 300 is in the folded configuration. In FIG. 3B, the example computing device 300 is in the unfolded configuration. In the example computing device 300 shown in FIGS. 3A and 3B, the foldable display 302 is mounted on the computing device 300 so that a display surface 304 of the foldable display 302 faces outward when the device 300 is in the folded configuration, simply for purposes of discussion and illustration. However, in some implementations, the foldable display 302 may be mounted so that the display surface 304 faces inward when the device 300 is in the folded configuration (not shown).

In the example computing device 300 shown in FIGS. 3A and 3B, the bendable section 316 of the foldable display 302 is at a central portion of the computing device 300, simply for purposes of discussion and illustration. In some implementations, the bendable section 316 may be located at positions other than the central portion of the computing device 300, and/or the foldable display 302 can include more bendable sections. In some implementations, the foldable display 302 can be substantially continuously bendable. In the example foldable display 302 shown in FIGS. 3A and 3B, the bendable section 316 allows the foldable display 302 to bend about an axis.

The hinge mechanism 330, in accordance with implementations described herein, may be located in the computing device 300, at a position corresponding to the bendable section 316 of the foldable display 302. The hinge mechanism 330 may support and guide the folding and the unfolding of the foldable display 302. That is, the hinge mechanism 330 may provide for a relatively natural folding and unfolding motion between the folded configuration shown in FIG. 3A and the unfolded configuration shown in FIG. 3B. In some implementations, the hinge mechanism 330 may change in length as components of the hinge mechanism 330 move relative to each other, and the computing device 300 is folded and unfolded. That is, in some implementations, the hinge mechanism 330 may change in length so that the neutral axis (in particular, the neutral axis of the portions of the computing device 300 that are bending, such as the hinge mechanism 330 and the foldable display 302) can exist within, or essentially coincide with, the thin film transistor (TFT) layer, of the foldable display 302. This may reduce or substantially eliminate tensile forces and/or compressive forces experienced by the fragile components at the TFT layer of the foldable display 302.

For example, in some implementations, a distance between the first housing 340A and the second housing 340B may change, for example, dynamically change, as the components of the hinge mechanism 330 move relative to each other, to accommodate the folding and the unfolding of the computing device 300, as described above. This change in length may be achieved through the interaction of a cross-axis helical gear arrangement coupled between the first housing 340A and the second housing 340B. For example, in some implementations, this interaction may drive the first and second housings 340A, 340B apart as the computing device 300 is folded, and may draw the first and second housings 340A, 340B together as the computing device 300 is unfolded. This change in length of the hinge mechanism 330 may follow a path of motion of a neutral layer, or a neutral axis, of the foldable display 302 as the computing device 300 (and the foldable display 302) moves between the folded configuration and the unfolded configuration. In some implementations, the rate of change in length of the hinge mechanism 330 may be substantially synchronized with the movement of the neutral axis of the foldable display 302, to reduce or substantially eliminate tensile and/or compressive forces on the fragile components of the foldable display 302, thereby preventing damage to the foldable display 302.

Figure 4A:
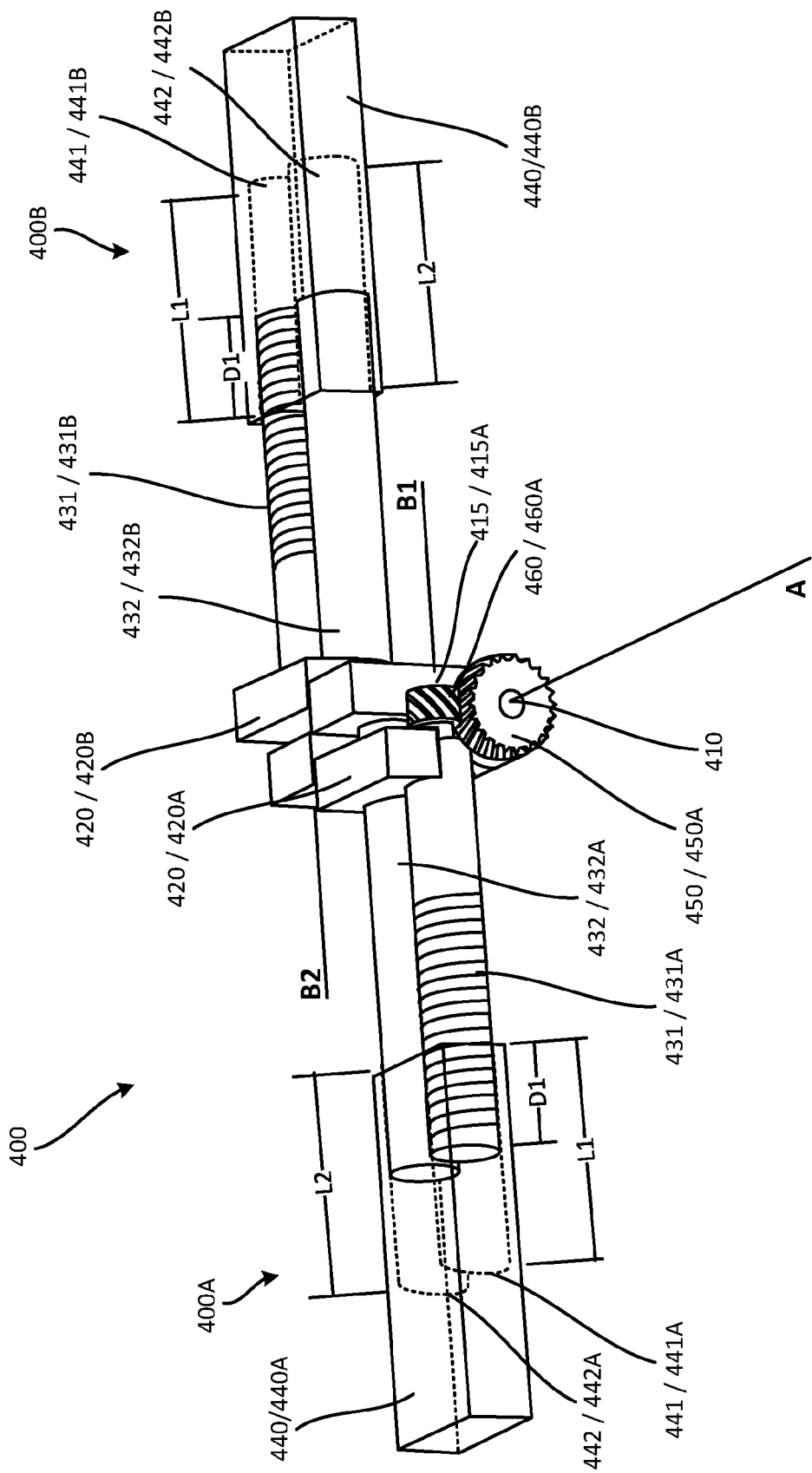
FIG. 4A is a first perspective view.
Figure 4B:
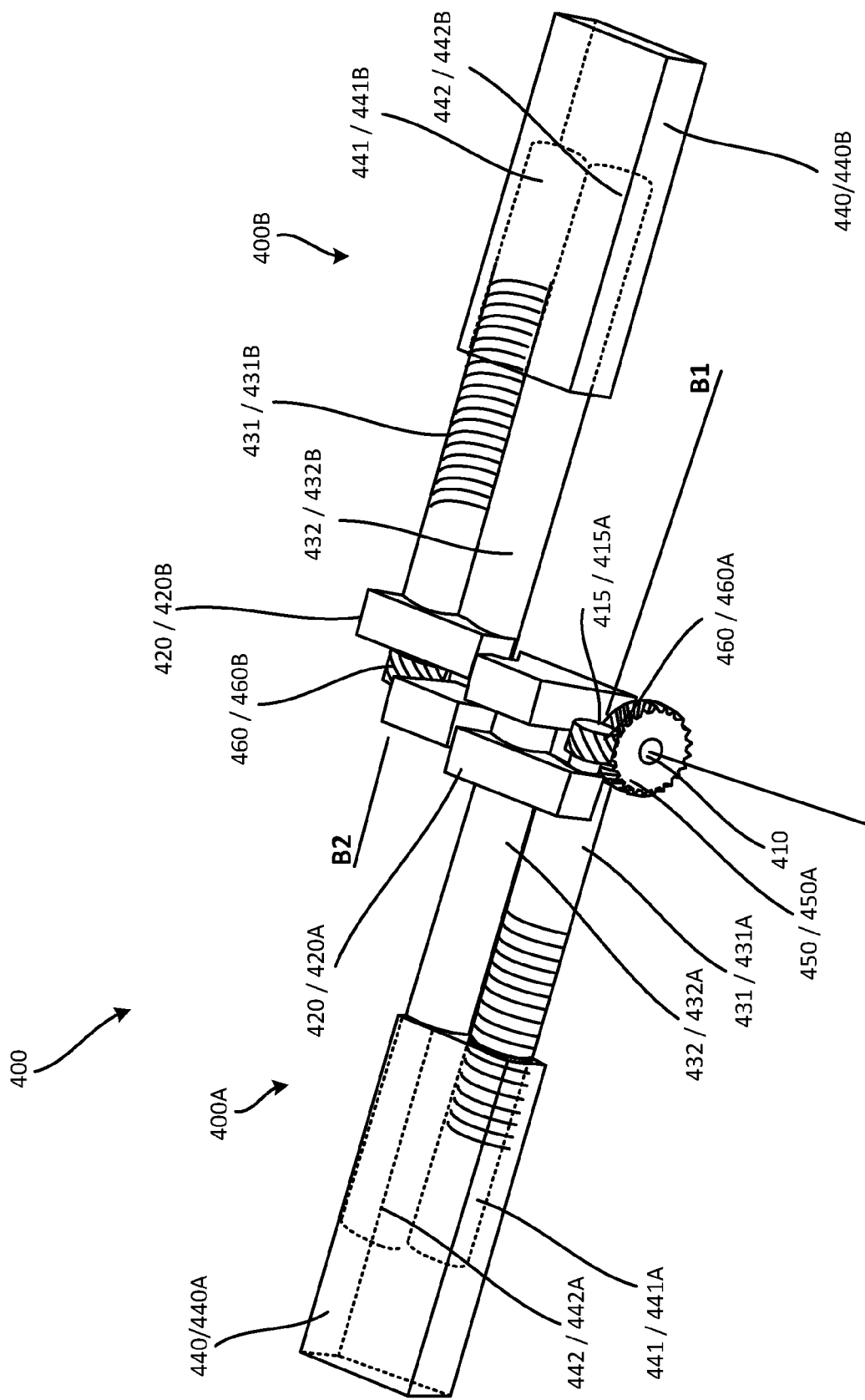
FIG. 4B is a second perspective view, of an example hinge module of the example hinge mechanism, in an unfolded configuration, in accordance with implementations described herein.
Figure 4C:
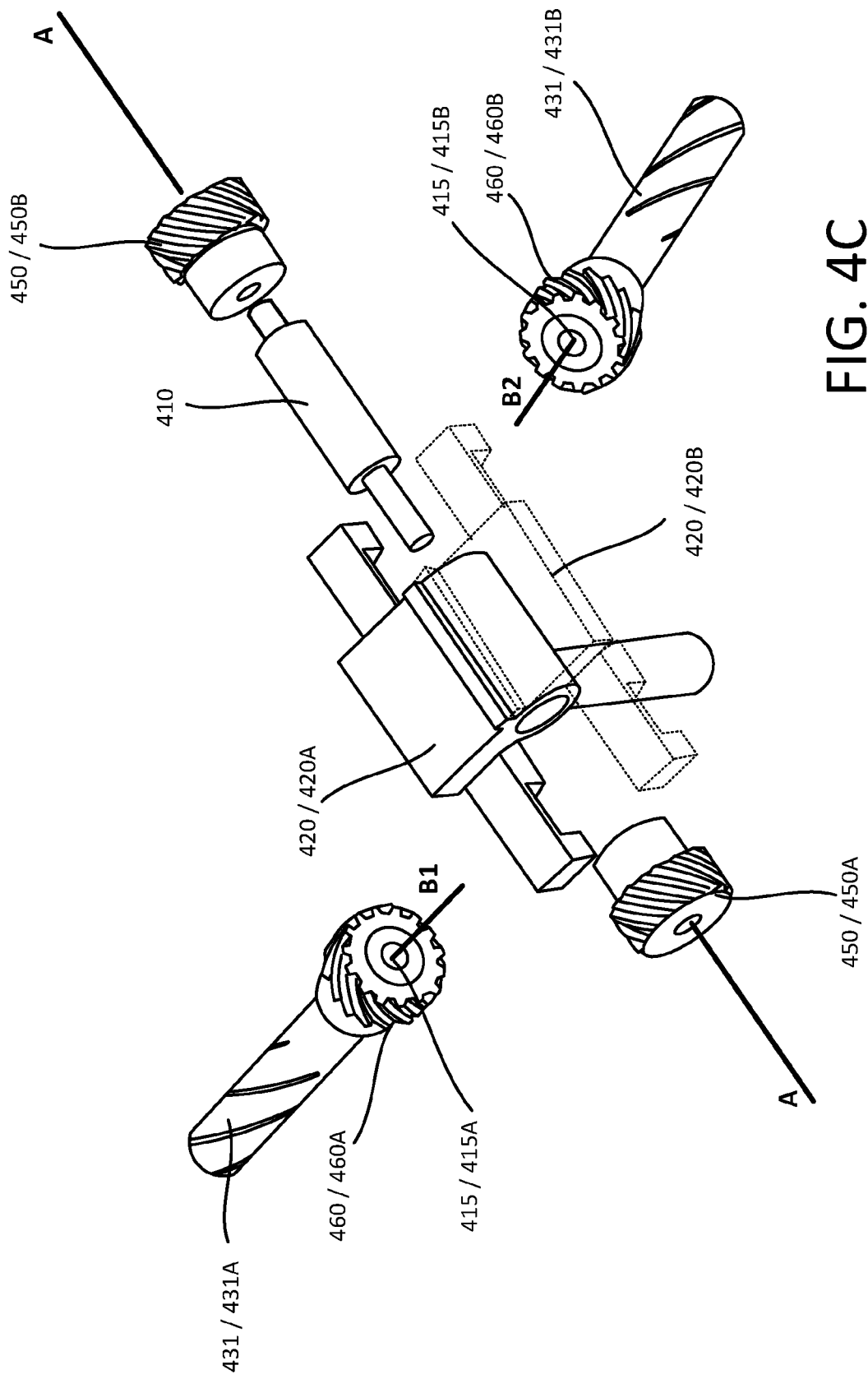
FIG. 4C is an exploded perspective view of a bracket, shaft and gear portion of the hinge module shown in FIGS. 4A and 4B, in accordance with implementations described herein.
Figure 5:
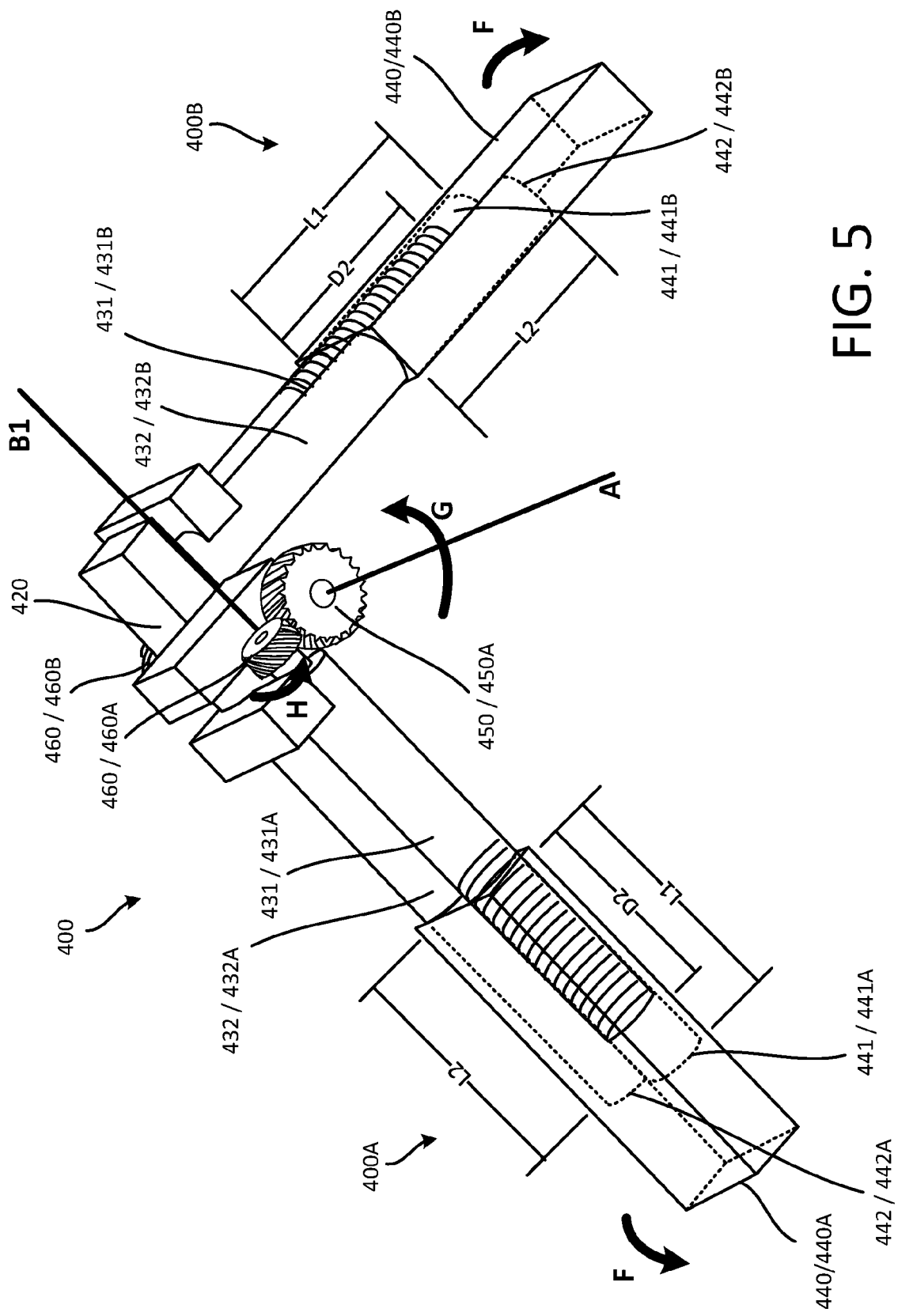
FIG. 5 is a perspective view of the example hinge module of the example hinge mechanism shown in FIGS. 4A and 4B, in a partially folded configuration, in accordance with implementations described herein.
Figure 6A:
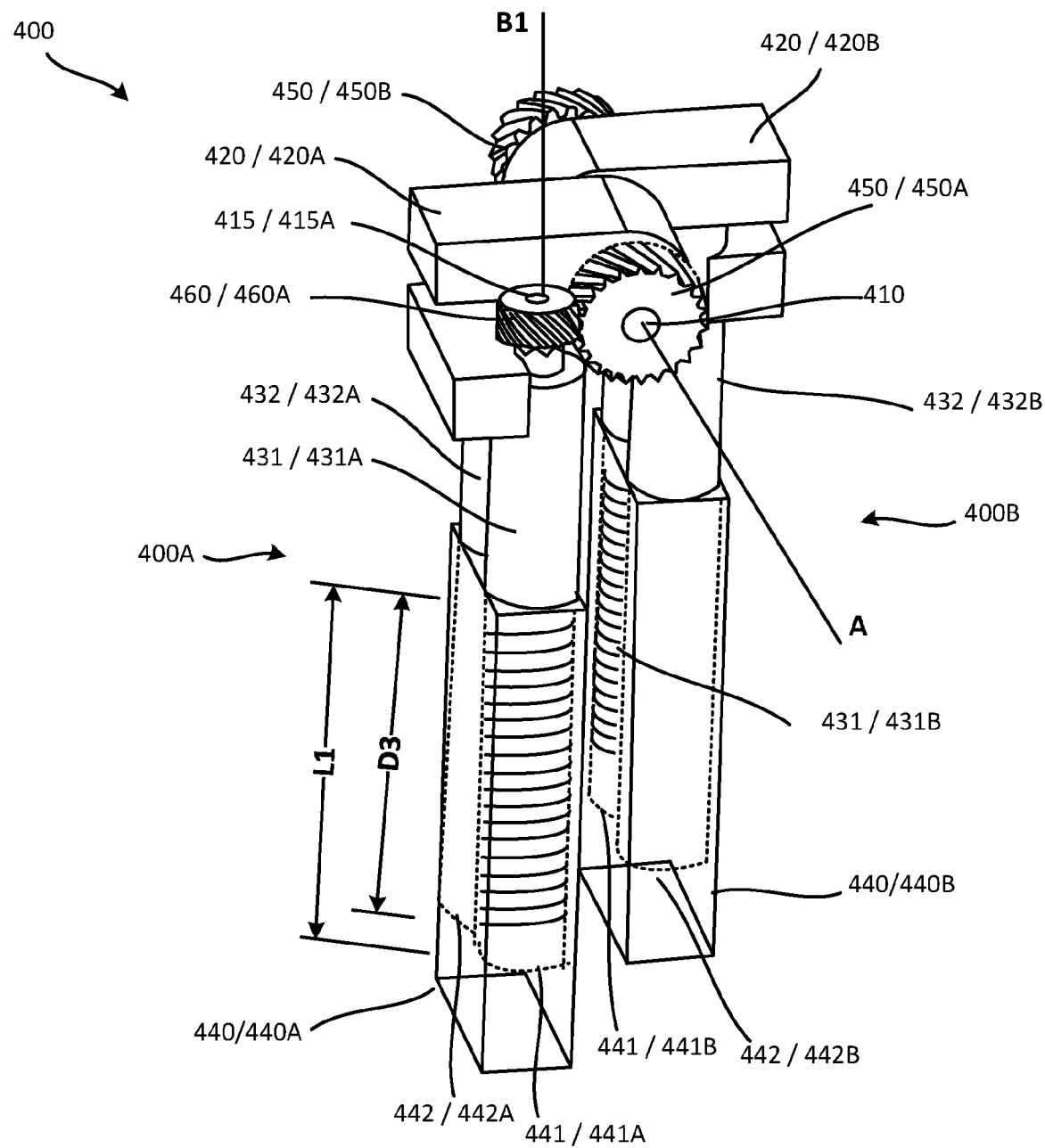
FIG. 6A is a first perspective view.
Figure 6C:
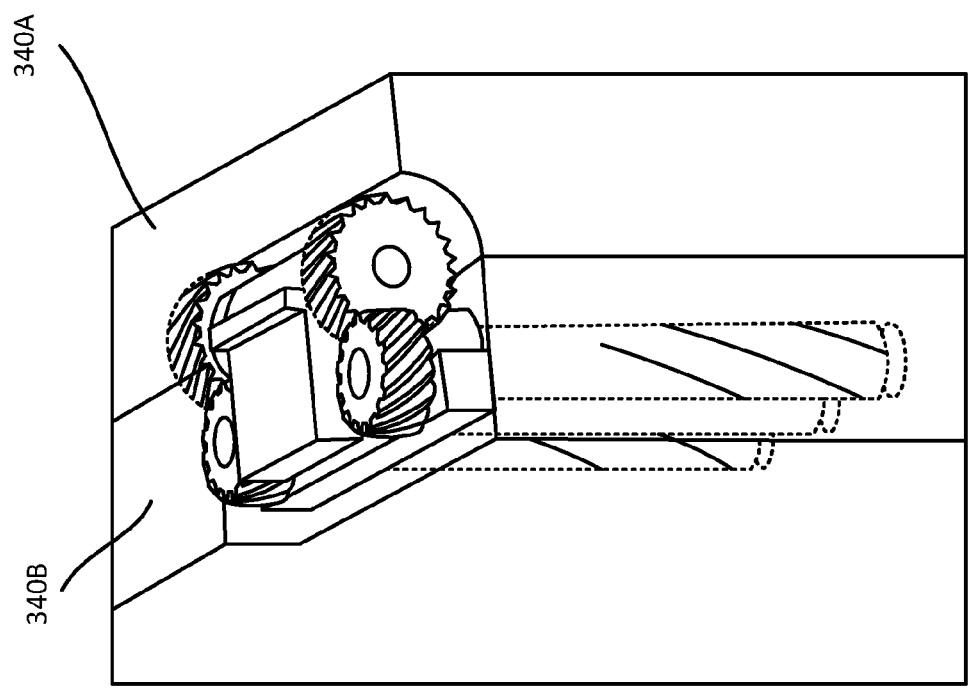
FIG. 6C is a perspective view of the example hinge mechanism in the folded configuration, coupled to an example housing of an example computing device, in accordance with implementations described herein.

FIGS. 4A through 6C are perspective views of an example hinge module 400 of the example hinge mechanism 330, in accordance with implementations described herein. In particular, FIG. 4A is a perspective view of the example hinge module 400 in an unfolded configuration, as viewed from a side of the example hinge module 400, and FIG. 4B is a second perspective view of the example hinge module 400 in the unfolded configuration, as viewed from a top of the example hinge module 400 (for example, a portion of the hinge module 400 oriented toward an exterior facing side of the computing device 300 in which it is installed). FIG. 4C is an exploded perspective view of a portion of the example hinge module shown in FIGS. 4A and 4B. In FIG. 4C, portions of a bracket 420 of the example hinge module 400 are shown in dotted lines, so that other components of the hinge module 400 are more easily visible. FIG. 6A is a perspective view of the example hinge module 400 in the folded configuration as viewed from the side of the example hinge module 400, and FIG. 6B is a perspective view of the example hinge module 400 as viewed from a bottom (i.e., interior folded portion) of the example hinge module, in accordance with implementations described herein. In FIG. 6B, base member portions of the example hinge module 400 are removed, so that an arrangement of gears in respective brackets is more easily visible. FIG. 6C is a side view of the example hinge module 400, in the folded configuration, coupled in a housing of the computing device 300. FIG. 5 is a side perspective view of the example hinge module 400 in an interim configuration, or a partially folded configuration (i.e., at an interim position between the unfolded configuration shown in FIGS. 4A-4B and the fully folded configuration shown in FIGS. 6A-6B), in accordance with implementations described herein.

As described above, the hinge mechanism 330, in accordance with implementations described herein, may include one or more hinge modules 400. In some implementations, the one or more hinge modules 400 may be arranged in a portion of the housing 340 of the computing device 300 corresponding to the bendable section 316 of the foldable display 302. A number of hinge modules 400 included in the hinge mechanism 330, and/or an arrangement of the hinge module(s) 400 in the housing 340 of the computing device 300, may be determined based on, for example, a form factor of the computing device 300 (i.e., size, shape, thickness and the like), a thickness of the foldable display 302, allowable bending limits of the foldable display 302, weight considerations, and other such factors.

In some implementations, each hinge module 400 may include a first hinge section 400A and a second hinge section 400B. The first hinge section 400A and the second hinge section 400B may be movably coupled, for example, rotatably or pivotably coupled, to each other about a central hinge shaft 410. In some implementations, the first hinge section 400A may be coupled to a first portion of the computing device 300, for example, to the first housing 340A of the computing device 300. In some implementations, the second hinge section 400B may be coupled to a second portion of the computing device 300, for example, to the second housing 340B of the computing device 300. In some implementations, the first hinge section 400A and the second hinge section 400B may be symmetrically arranged about the central hinge shaft 410 (or, in other words, the second hinge section 400B may be the mirror image of the first hinge section 400A), producing a symmetrical, or mirrored, movement of the first and second hinge sections 400A, 400B about the central hinge shaft 410. That is, the central hinge shaft 410 may define a first axis A, or a central axis A about which the first and second hinge sections 400A, 400B of the hinge module 400 may rotate. In this manner, as the first and second hinge sections 400A, 400B of the hinge module 400 rotate relative to each other about the central hinge shaft 410, the first and second housings 340A, 340B may also rotate, and move, together with the first and second hinge sections 400A, 400B, so as to fold and unfold the computing device 300 and the foldable display 302 coupled to the housing 340.

In some implementations, the first hinge section 400A may include a first base member 440A having a first passage 441A, or a lead passage 441A, and a second passage 442A, or a guide passage 442A, formed therein. The lead passage 441A may have a length L1. The guide passage 442A may have a length L2. In some implementations, the length L2 of the guide passage 442A may be substantially equal to the length of the lead passage 441A. In some implementations, the first base member 440A may be coupled, for example, fixedly coupled, in the first housing 340A of the computing device 300. In some implementations, the first base member 440A (and the passages 441A, 442A formed therein) may be integrally formed in the first housing 340A of the computing device 300.

The first hinge section 400A may include a first rod 431A, or a lead rod 431A, and a second rod 432A, or a guide rod 432A. In some implementations, a length of the lead rod 431A and a length of the guide rod 432A may be substantially equal. A first end portion of the lead rod 431A and a first end portion of the guide rod 432A may be coupled to a first bracket 420A. The first bracket 420A may couple, for example, rotatably couple, the lead rod 431A and the guide rod 432A, to the central hinge shaft 410, and may maintain a relative position of the lead rod 431A and the guide rod 432A. A second end portion of the lead rod 431A may be received, for example, movably received, in the lead passage 441A of the base member 440A. In some implementations, the lead passage 441A and the lead rod 431A may be compatibly threaded, such that the lead rod 431A is threadably received in the lead passage 441A. A second end portion of the guide rod 432A may be received, for example, movably received, in the guide passage 442A formed in the first base member 440A.

A first gear (a.k.a a central gear) 450A may be mounted on, for example, fixed to, an end portion of the central hinge shaft 410, such that the central gear 450A rotates together with the central hinge shaft 410. A second gear (a.k.a a cross gear) 460A may be mounted on a second shaft (a.k.a a cross shaft) 415A, coupled to the first end portion of the lead rod 431A. The cross shaft 415A may define a second axis B1, or a cross axis B1, about which the cross gear 460A and the lead rod 431A rotate. In some implementations, the central gear 450A and/or the cross gear 460A may be helical gears.

The cross gear 460A may be in meshed engagement with the central gear 450A, such that the second, or cross gear 460A rotates (about the axis B1) in response to rotation of the first, or central gear 450A about the axis A. As the cross shaft 415A is fixed to the lead rod 431A, and the cross gear 460A is fixedly mounted on the cross shaft 415A, the lead rod 431A, the cross shaft 415A and the cross gear 460A may rotate together about the axis B1 in response to the rotation of the central gear 450A about the first axis A.

As noted above, the first and second sections 400A, 440B of the hinge module 400 may be symmetric, or mirrored, relative to the central hinge shaft 410 and the central gear 450. Thus, in some implementations, the second hinge section 400B may include a second base member 440B having a first passage 441B, or a lead passage 441B, having a length L1, and a second passage 442B, or a guide passage 442B, having a length L2. In some implementations, the second base member 440B may be coupled, for example, fixedly coupled, in the second housing 340B of the computing device 300. In some implementations, the second base member 440B (and the passages 441B, 442B formed therein) may be integrally formed in the second housing 340B of the computing device 300.

The second hinge section 400B may include a first rod 431B, or a lead rod 431B, and a second rod 432B, or a guide rod 432B. A first end portion of the lead rod 431B and a first end portion of the guide rod 432B may be coupled to a second bracket 420B. The second bracket 420B may couple, for example, rotatably couple, the lead rod 431B and the guide rod 432B, to the central hinge shaft 410, and may maintain a relative position of the lead rod 431B and the guide rod 432B. A second end portion of the lead rod 431B may be received, for example, movably received, in the passage 441B of the base member 440B. In some implementations, the passage 441B and the lead rod 431B may be compatibly threaded, such that the lead rod 431B is threadably received in the passage 441B. A second end portion of the guide rod 432B may be received, for example, movably received, in the guide passage 442B formed in the second base member 440B.

A first gear (a.k.a a central gear) 450B may be mounted on, for example, fixed to, an end portion of the central hinge shaft 410 (i.e., an end portion thereof opposite where the central gear 450A is mounted), such that the central gear 450B rotates together with the central hinge shaft 410. A second gear (a.k.a a cross gear) 460B may be mounted on a second shaft 415B, or a cross shaft 415B, coupled to the first end portion of the lead rod 431B. The cross shaft 415B may define a second axis B2, or a cross axis B2, about which the cross gear 460B and the lead rod 431B rotate. In some implementations, the central gear 450B and/or the cross gear 460B may be helical gears.

The cross gear 460B may be in meshed engagement with the central gear 450B, such that the second, or cross gear 460B rotates (about the axis B2) in response to rotation of the first, or central gear 450B about the axis A. As the cross shaft 415B is fixed to the lead rod 431B, and the cross gear 460B is fixedly mounted on the cross shaft 415B, the lead rod 431B, the cross shaft 415B and the cross gear 460B may rotate together about the axis B2 in response to the rotation of the central gear 450B about the first axis A.

In the unfolded (i.e., substantially fully unfolded) configuration of the hinge module 400 shown in FIGS. 4A and 4B, the lead rod 431A is threadably inserted in the lead passage 441A by a distance D1 (that is less than the length L1 of the passage 441A), and the lead rod 431B is, similarly, threadably inserted in the lead passage 441B by a distance D1 (that is less than the length L1 of the passage 441B). External forces, applied in the directions of the arrows F shown in FIG. 5 (to, for example, move the hinge module 400 from the unfolded configuration shown in FIGS. 4A-4B to the folded configuration shown in FIGS. 6A-6B) may cause the central gear 450, or first helical gear 450 (and the central hinge shaft 410) to rotate in the direction of the arrow G. This rotation of the central gear 450, or first helical gear 450, may, in turn, cause the cross gear 460, or second helical gear 460, to rotate in the direction of the arrow H, due to the meshed engagement of the gears 450, 460. Rotation of the cross gear (a.k.a second helical gear) 460, in the direction of the arrow H may cause the lead rod 431 to also rotate in the direction of the arrow H.

In response to this rotation of the lead rod 431 in the direction of the arrow H, each lead rod 431 may be drawn into the respective lead passage 441 of the respective base member 440, due to the threaded engagement of the lead rod 431 in the lead passage 441. Thus, in the interim configuration shown in FIG. 5, the lead rod 431 has advanced into the lead passage 441 to a distance D2 (that is greater than the distance D1, and less than the length L1 of the passage 441). Thus, in response to the external forces F that cause corresponding rotation of the gears 450, 460 and rotation of the lead rod 431, the first and second base members 440A, 440B may be drawn closer together, or closer to the respective brackets 420 and central hinge shaft 410, thus initiating a change, or an adjustment, in overall length of the hinge module 400.

Continued application of the external forces in the directions of the arrows F may cause the first helical gear 450 (and the central hinge shaft 410) to continue to rotate in the direction of the arrow G, and the second helical gear 460, to continue to rotate in the direction of the arrow H, due to the meshed engagement of the gears 450, 460, until the hinge module 400 is in the substantially fully closed position shown in FIGS. 6A and 6B.

In response to the continued rotation of the lead rod 431 in the direction of the arrow H, the lead rod 431 may continue to be drawn further into the lead passage 441 of the base member 440, due to the threaded engagement of the lead rod 431 in the lead passage 441. In the substantially fully folded configuration shown in FIGS. 6A and 6B, the lead rod 431 has advanced into the lead passage 441 to a distance D3 (that is greater than the distance D1 and the distance D2). Thus, in response to the continued application of the external forces F, corresponding continued rotation of the gears 450, 460 and rotation of the lead rod 431, the first and second base members 440A, 440B may be drawn closer together, or closer to the respective brackets 420 and central hinge shaft 410, thus further changing, or adjusting, the overall length of the hinge module 400.

This dynamic change in the length of the hinge module 400 as the hinge module is folded, as described above, may maintain the folding, or bending of the foldable display 302 (coupled to the housing 340 of the computing device 300) within the neutral layer of the foldable display 302. This may reduce or substantially eliminate excessive stresses (i.e., compressive and/or tensile stresses) on fragile components of the foldable display 302 within the neutral layer.

In some implementations, the guide rod 432 may be slidably movable within the guide passage 442. In some implementations, the sliding movement of the guide rod 432 in the guide passage 442 of the base member 440 may correspond to the movement of the lead rod 431 in the lead passage 441 of the base member 440. For example, in the folding motion described above with respect to FIGS. 4A through 6B, as the lead rod 431 is drawn further into the lead passage 441 (in response to the rotation of the first and second helical gears 450, 460 and the threaded engagement of the lead rod 431 and the lead passage 441), the guide rod 432 is drawn into the guide passage 442.

In some implementations, in which one or more of the hinge modules 400 may be positioned within the housing 340, the guide rod 432 positioned within the guide passage 442 may define an anti-rotation mechanism that restricts rotation of the hinge module 400. That is, without the guide rod 432 positioned in the guide passage 442, rotation of the threaded lead rod 431 into the threaded lead passage 441 could naturally cause the base member 440 to rotate. However, the positioning of the guide rod 432 in the guide passage 442 may maintain the position of the base member 440, and counteract the rotational force applied to the base member 440 due to the rotation of the lead rod 431 into the threaded lead passage 442. For example, the positioning of the guide rod 432 in the guide passage 442 may restrict rotation of the base member 440, thus allowing the threads on the exterior of the lead rod 431 to screw against interior threads in the lead passage 441, with the pitch of the mating threads on the lead rod and lead passage of the lead member controlling the rate of progress in the axial direction of the lead rod, into and out of the lead passage 441, depending on the direction of rotation of the lead rod 431. A foldable display, structurally connected with the base member or housing threaded to the lead rod, slides under the control of the mating threads to accommodate flex of the foldable display as the housing opens and closes.

As noted above, the hinge mechanism 330 including at least one hinge module 400 may be assembled as described above and coupled to the housing 340 of a computing device, such as the example computing device 300 shown in FIGS. 3A-3B. An example installation of the one of the hinge module(s) 400 of the hinge mechanism 330 is shown in FIG. 6C, in the substantially fully folded configuration.

Thus, in a hinge mechanism 330 including one or more hinge modules 400, in accordance with implementations described herein, a first, or primary hinge action may provide for a rotation action of the hinge mechanism 330. The first, or primary hinge action may facilitate rotation of, for example, the first and second housings 340 of the computing device 300. In the hinge mechanism 330 including one or more hinge modules 400, in accordance with implementations described herein, a secondary hinge action may allow the hinge mechanism to change in length through its stroke, or through its rotational range. For example, the primary hinge action may include rotation about a primary center of rotation, such as, for example, rotation of the hinge module 400 about the first hinge axis A. The secondary hinge action may be enabled through the action of the cross-helical gears (i.e., the first and second helical gears 450, 460) as the hinge module 400 moves between the unfolded configuration and the folded configuration, and the rods 431, 432 move into and out of the respective passages 441, 442, to provide for the change in length of the hinge module 400, as described above. Thus, a hinge mechanism 330 including one or more hinge modules 400, in accordance with implementations described herein, provides for both rotation, or bending, or folding, as well as a change in stroke length of the hinge mechanism 330/hinge module 400, to adapt to the folding/bending of the foldable display 302 and maintain the folding/bending action within the neutral layer of the foldable display 302.

The action of the hinge mechanism 330 including one or more hinge modules 400 is described above with respect to FIGS. 4A through 6C, in an example folding action of the hinge mechanism 330. A reverse action may occur as the computing device 300 including the hinge mechanism 330 having one or more hinge modules 400 moves from the folded configuration shown in FIGS. 6A-6C to the folded configuration shown in FIGS. 4A-4B. That is, the cross-axis helical gears 450, 460 may rotate in opposite directions to what is shown in FIG. 5, to cause the lead rod 431 to be drawn out of the lead passage 441 as the computing device 300 is unfolded. In this situation, the guide rod 432 will be drawn out of the guide passage 442 as the lead rod 431 rotates out of the lead passage 441.

As noted above, the hinge module 400 includes the first hinge section 400A and the second hinge section 400B, each rotatably coupled to the central hinge shaft 410, and symmetrically arranged relatively to the central hinge shaft 410. Operation of the components of the first hinge section 400A may mirror operation of the components of the second hinge section 400B, as the hinge mechanism 330 (and the computing device 300) move between the unfolded configuration and the folded configuration. Thus, in some implementations, movement of the first hinge section 400A and the second hinge section 400B may be substantially synchronized as the hinge mechanism 330 (and the computing device 300) move between the unfolded configuration and the folded configuration. The hinge mechanism 330 including at least one hinge module 400, in accordance with implementations described herein, may provide for a fluid, relatively natural, motion between the unfolded and folded configurations, while avoiding a shift in the neutral axis of the foldable display and maintaining the foldable display within allowable bending limits.

In some implementations, various attributes of the components of the hinge module(s) 400 of the hinge mechanism 330, and/or interactions between the components, may be selected to, in turn, determine an amount of bending or rotation facilitated by the hinge module(s) 400, an amount of linear translation (i.e., change in overall length of the hinge mechanism 330) provided by the hinge modules(s) 400, and the like. For example, in some implementations, a size, and/or a relative size of the first and second helical gears 450, 460 may be selected to, in turn, determine an amount of translational movement of the hinge module 400. In some implementations, a pitch of the first and second helical gears 450, 460 may be selected to, in turn, determine an amount of translational movement of the hinge module 400. In some implementations, a mounting position of the first and second helical gears 450, 460 may be selected, and/or a relative position of the central shaft 410 and the cross shaft 415 may be selected, to, in turn, determine an amount of translational movement of the hinge module 400.

In some implementations, an amount of bending or rotation facilitated by the hinge module(s) 400, an amount of linear translation (i.e., change in overall length of the hinge mechanism 330) provided by the hinge modules(s) 400 may be determined by selecting a particular gear ratio between the first helical gear 450 and the second helical gear 460. That is, in some implementations, the gear ratio may subsequently determine a in size of one, or both, of the gears 450, 460, a change in relative position of the gears 450, 460 (which may, in turn, cause a change in the relative position of the shafts 410, 415), and/or a change in pitch of the gears 450, 460, so that the gears 450, 460 mesh properly and do not encounter interference or seize during operation.

In some implementations, magnets may be included in the computing device 300 to, for example, maintain the computing device 300 in the unfolded configuration and/or in the folded configuration. That is, in some implementations, magnets may provide a reinforcement mechanism for maintaining the computing device 300 including the foldable display 302 in a desired configuration.

Figure 7C:
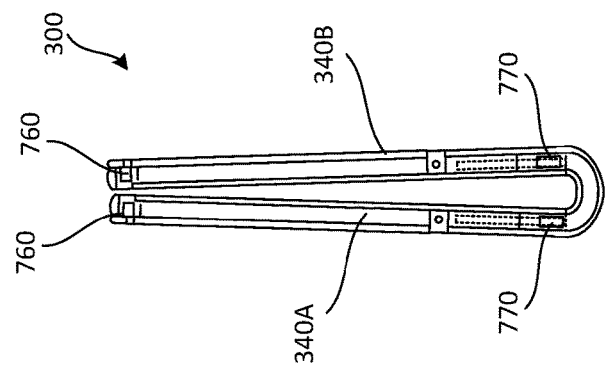
FIG. 7C is a side view of the example computing device including the example hinge mechanism, in a folded configuration, in accordance with implementations described herein.
Figure 7A:
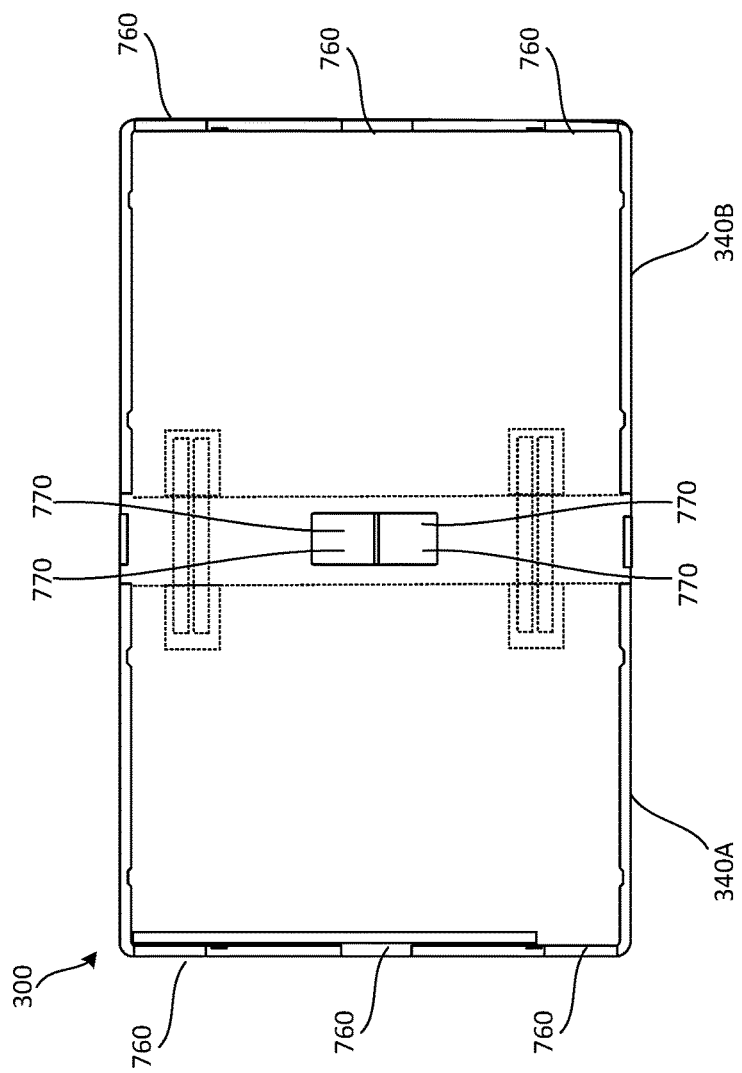
FIG. 7A is a top view.
Figure 7B:
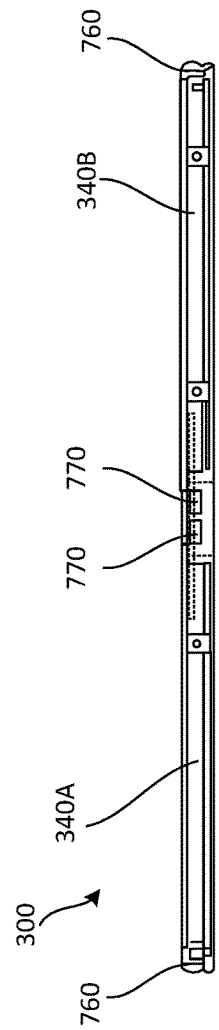
FIG. 7B is a side view, of an example computing device including an example hinge mechanism, in an unfolded configuration.

For example, as shown in FIGS. 7A-7C, in some implementations, one or more first magnets 760 may be provided at corresponding positions along an outer edge portion of the first housing 340A and along an outer edge portion of the second housing 340B of the computing device 300. In the folded configuration shown in FIG. 7C, the first magnets 760 may be aligned and may exert an attractive force that draws and holds the first and second housings 340A, 340B together in the folded configuration. In some implementations, one or more second magnets 770 may be provided at corresponding positions along an inner edge portion of the first housing 340A and an inner edge of the second housing 340B of the computing device 300. In the unfolded configuration shown in FIGS. 7A and 7B, the second magnets 770 may be aligned and may exert an attractive force that draws and holds the first and second housings 340A, 340B together in the unfolded configuration.

In a computing device including a hinge mechanism, in accordance with implementations as described herein, the hinge mechanism may dynamically support and guide the folding and unfolding of a foldable display, with a relatively natural motion, while also providing support to the bendable section of the foldable display, and avoiding shifting of the neutral axis of the foldable display.

The devices and apparatuses described herein can be included as part of a computing device, that includes, for example, a processor for executing instructions and a memory for storing the executable instructions. Specific structural and functional details disclosed herein are merely representative for purposes of describing example embodiments. Example embodiments, however, be embodied in many alternate forms and should not be construed as limited to only the embodiments set forth herein.

It is understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It is understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, and an, are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A hinge mechanism including at least one hinge module, the at least one hinge module comprising:
    a central hinge shaft defining a single central hinge axis;
    a first hinge section coupled to a first portion of the central hinge shaft; and
    a second hinge section coupled to a second portion of the central hinge shaft, wherein the first hinge section and the second hinge section are rotatable relative to each other about the single central hinge axis, wherein the first hinge section and the second hinge section each include:
    a bracket coupled to the central hinge shaft;
    a first rod having a first end thereof coupled to the bracket and a second end thereof movably received in a first passage defined in a base member;
    a second rod having a first end thereof coupled to the bracket and a second end thereof movably received in a second passage defined in a base member;
    a first helical gear mounted on an end portion of the central hinge shaft, concentric with the central hinge shaft, such that the first helical gear rotates about the single central hinge axis together with the central hinge shaft; and
    a second helical gear mounted on an end portion of the first rod, in meshed engagement with the first helical gear,
    wherein the single central hinge axis is in a different plane than any of the first rod or the second rod of the first or second hinge sections.

2. The hinge mechanism of claim 1, wherein the first hinge section and the second hinge section are symmetrically arranged about the central hinge shaft, and
    wherein movement of the first and second rods in the first and second passages of the base member of the first hinge section is synchronized with movement of the first and second rods in the first and second passages of the base member of the second hinge section.

3. The hinge mechanism of claim 1, wherein
    in a first configuration of the hinge module, the first rod is at a first position within the first passage defined in the base member, and the base member of the first hinge section and the base member of the second hinge section are spaced apart by a first distance; and
    in a second configuration of the hinge module, the first rod is at a second position within the first passage defined in the base member, and the base member of the first hinge section and the base member of the second hinge section are spaced apart by a second distance that is greater than the first distance.

4. The hinge mechanism of claim 1, wherein the first rod is threadably engaged in the first passage, such that the first rod moves in a first longitudinal direction into the first passage in response to rotation of the bracket about the single central hinge axis in a first rotational direction, and the first rod moves in a second longitudinal direction out of the first passage in response to rotation of the bracket about the single central hinge axis in a second rotational direction.

5. The hinge mechanism of claim 4, wherein a position of the second rod in the second passage defines an anti-rotation mechanism that restricts rotation of the base member in response to threaded movement of the first rod in the first passage.

6. The hinge mechanism of claim 1, wherein the second helical gear rotates about a cross-axis that is orthogonal to the single central hinge axis, in response to rotation of the first helical gear about the single central hinge axis.

7. The hinge mechanism of claim 6, wherein
the first rod rotates together with the second helical gear; and
the first rod is threadably engaged in the first passage such that rotation of the first rod in a first direction about the cross-axis draws the first rod further into the first passage, and rotation of the first rod in a second direction about the cross-axis draws the first rod further out of the first passage.

8. The hinge mechanism of claim 3, wherein the hinge mechanism is configured to be received in a computing device, at a position corresponding to a bendable section of a foldable display, in a space formed between a first housing and a second housing of the computing device, with the first hinge section of each hinge module coupled to the first housing, and the second hinge section of each hinge module coupled to the second housing.

* * * * *